UNITED STATES PATENT OFFICE.

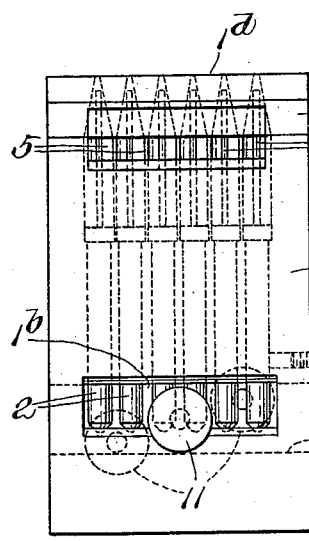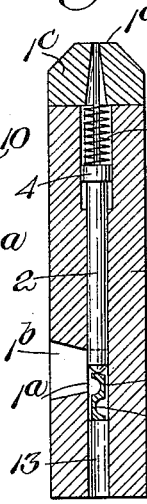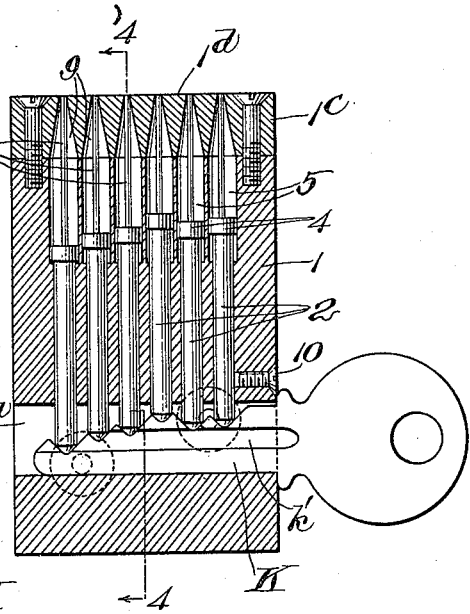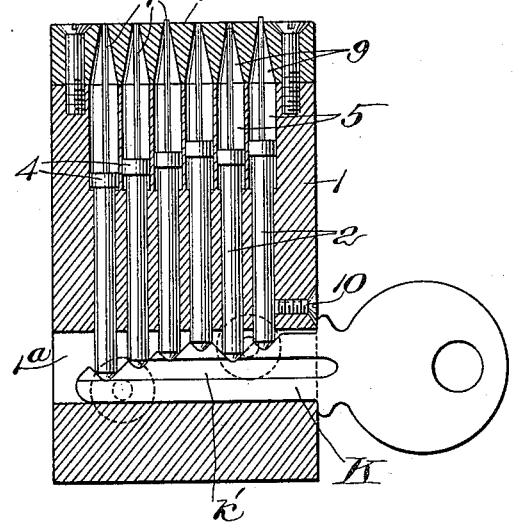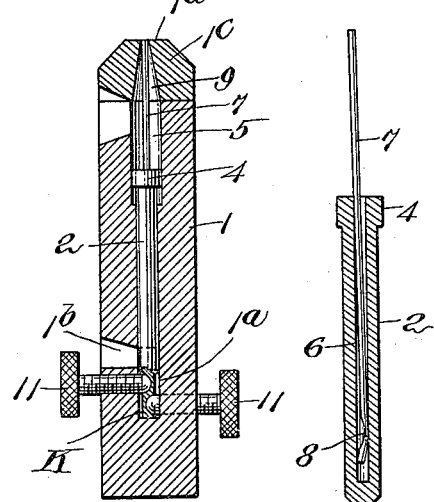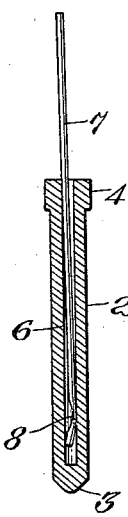

JOHN C. ROSS, OF BOSTON, MASSACHUSETTS.

KEY-GAGE.

1,175,819.

Specification of Letters Patent.

Patented Mar. 14, 1916.

Application filed November 27, 1914. Serial No. 874,177.

*To all whom it may concern:*

Be it known that I, JOHN C. ROSS, a citizen of the United States, and resident of Boston, in the county of Suffolk and State of Massachusetts, have invented new and useful Improvements in Key-Gages, of which the following is a specification.

This invention relates to gages for measuring and testing the accuracy of keys intended for pin tumbler locks, and its object is to provide a convenient and effective tool or gage, readily adjustable to keys of various sizes and shapes, by which the locksmith may quickly test the accuracy of his work in making duplicate keys, and by which the exact location and extent of any inaccuracies may be immediately seen, and the inaccuracies remedied.

In the accompanying drawings which illustrate certain embodiments of the invention,—

Figure 1 is a side view of a key gage containing the invention in its preferred form; Figs. 2 and 3 are views of said gage in vertical longitudinal section, showing keys in the gage and illustrating the mode of use of the gage as hereinafter explained; Fig. 4 is a vertical cross section on line 4—4 of Fig. 2; Fig. 5 is a longitudinal section, on an enlarged scale, of one of the telescoping gage pins; and Fig. 6 is a vertical cross section illustrating a modification of the invention.

Referring to the drawings, 1 represents the frame or housing of the gage, made with a key way 1ª opening through the end of the frame. A sight aperture 1ᵇ is provided in the side of the frame beside the key way, so that one side of the key and the ends of the gage pins are exposed to view to show whether the gage pins are in correct engagement with the face of the key, and whether the notches in the key fit the ends of the pins. At the top of the frame is a gage plate 1ᶜ, having a straight gage surface 1ᵈ.

A series of extensible and contractile gage members are movably mounted in the frame so that one end will project into engagement with the face of a key in the key way, while the other end coöperates with the gage surface of the frame. In the exemplification of the invention herein shown, said gage members consist of gage pins made of extensible and contractile sections mounted to move endwise in the frame with their inner ends projecting into the key way 1ª and their outer ends projecting through the gage surface 1ᵈ. Each such gage pin preferably consists of a tubular section 2, and a rod section 7 telescoping into section 2. Said tubular section has its lower end 3, shaped to conform to the shape of the notches in the face of the keys for which the gage is used; it will preferably be of the same shape as ends of the tumbler pins in the kind of locks in which the key being tested is used. As herein shown the end 3 is rounded or convex in shape, like the pin tumblers used in the prevailing form of locks. Each section 2 is provided with a head 4 which works in an enlarged portion 5 of the pin socket of the frame, in which the pin slides. In the bore 6 of the tubular section 2 is the telescoping rod section 7 which is frictionally held in any desired position of adjustment. Any suitable frictional connection between the pin sections may be used, but a simple and effective mode of obtaining the necessary friction consists in making the rod section 7 of spring steel, or other elastic material, with a bent or offset portion 8 which presses against the bore 6. A part of the material at the point 8 may be cut or filed away, and the lower extremity of the rod below 8 may be slightly bent out of alinement with the body of the rod, so as to exert a continuous yielding pressure upon the walls of bore 6.

The pin sockets in which the gage pins are mounted to slide endwise, open both into the key way 1ª and through the gage plate 1ᶜ, said sockets being tapered in the gage plate, as shown at 9, so as to form constricted orifices through gage surface 1ᵈ, fitting the small rod sections 7, while the tapered parts of the sockets guide the ends of the gage pins through the gage plate. A shoulder in each pin socket engages the head 4 of the tubular pin section to support the pin with its inner end normally extending part way across the key way in the position best illustrated in Fig. 1.

Adjacent to the entrance of the key way is an adjustable key stop, adapted to engage the base of a key to limit and regulate the extent to which the key may be thrust into the key way.

One or more adjustable guides, in the form of thumb screws 11, are mounted in the sides of the frame, to project into the sides of the key way. These guides are intended to engage the usual longitudinal grooves $k'$ in a key K, and prevent the key from being tilted at either end while it is being held in the key way, as might happen if there was no such provision for holding the bottom of the key flat on the bottom of the key way. The position of such grooves in the keys is to a certain extent standardized, and several guides 11 may be provided at different elevations to correspond to the standard or the more usual positions of the grooves.

It will be understood that the gage pins are mounted to slide freely in their pin sockets so that they will move in either direction by gravity. If it is desired to lengthen or pull out the extensible sections the gage is inverted, whereupon the pins will drop and the rod sections will protrude through the orifices in gage plate $1^c$ sufficiently to be readily seized and pulled out, the tapered or conical part 9 of the sockets acting as a stop for the tubular sections 2.

In use, the pattern key or master key, duplicates of which are to be measured or tested, is inserted in the key way, whereupon the series of gage pins will move endwise to permit the passage of the key, and when the key is thrust home will severally find their position, each in engagement with its corresponding notch in the key. The pin sections 2 thus stand at different elevations, with the rod sections 7 projecting different lengths beyond the gage surface $1^d$. The user then presses back the ends of all the rod sections 7, until their extremities are all flush with the gage surface $1^d$. The parts are then in the position shown in Fig. 2. The pattern key is then withdrawn and the key to be measured or tested is inserted in its place. If the key is correct and accurate, that fact will be demonstrated by the outer ends of the gage pins all coming exactly flush with the gage surface $1^d$, as in Fig. 2. If, however, there is any inaccuracy in the depth or shape of any of the notches in the key, such inaccuracy will at once be detected by the fact that some one or more of the pin ends will fail to register exactly with the gage surface $1^d$. See for example, Fig. 3, where the first pin at the right projects a little above the gage surface, indicating that the corresponding notch or depression in the key K is too shallow, the second pin end stands a little below the gage surface indicating that the corresponding notch in the key is too deep, and the fourth pin also projects a little. The locksmith is therefore informed which of the notches require correction, and the exact extent of such correction.

Ordinarily it will be sufficient to rely upon gravity to hold the pins in engagement with keys, especially as the sight aperture $1^b$ enables the user to see that the pin ends are all in proper engagement with the key. Should it be desired however, to secure a firmer pressure of the pins against the key, a coil expansion spring 12 (Fig. 6) may be used in each pin socket 5, one end of which presses against the head 4 and the other end against a shoulder formed by the under side of gage plate $1^c$. As such springs will always tend to thrust the pins downward toward the key way, it will obviously be impossible to slide the pins outward through the gage plate $1^d$ for the purpose of pulling out or extending the telescoping rod sections, by merely inverting the gage. Therefore an aperture 13 is provided in the frame opposite each pin socket, through which a wire or other suitable implement may be inserted to push the pins upward and outward against the pressure of the springs, until the rods 7 can be seized and pulled out or extended.

I claim:—

1. A key gage comprising a frame having a key way and a gage surface, and a number of extensible and contractile gage members movably mounted in said frame adapted to make contact with a key in the key way and coöperating with the gage surface to indicate, in relation to the gage surface, the contour of a key in the key way.

2. A key gage comprising a frame having a key way and a gage surface, and a number of extensible and contractile gage pins, each consisting of a plurality of pin sections relatively adjustable lengthwise to vary the length of the gage pin, said gage pins being each mounted to move endwise in the frame and adapted to make contact by one end pin section with a key in the key way, the other end section coöperating with the gage surface to indicate, in relation to the gage surface, the contour of a key in the key way.

3. A key gage comprising a frame having a key way and a gage surface, and a number of extensible and contractile gage members movably mounted in said frame adapted to make contact with a key in the key way and coöperating with the gage surface to indicate, in relation to the gage surface, the contour of a key in the key way, and an adjustable key stop adapted to determine the penetration of the key into the key way.

4. A key gage comprising a frame having a key way and a gage surface, and a number of extensible and contractile gage members movably mounted in said frame adapted to make contact with a key in the key way and coöperating with the gage surface to indicate, in relation to the gage surface, the contour of a key in the key way, and an adjustable guide adapted to engage a longitudinal groove in the side of the key in the key way.

5. A key gage comprising a frame having a gage surface, a key way, and a series of pin sockets extending from said key way through said gage surface, and a series of gage pins mounted to slide in said pin sockets, each gage pin consisting of telescoping sections.

6. A key gage comprising a frame having a key way and a gage surface, and a number of gage pins each consisting of a tubular section and a rod section telescoping in said tubular section, said pins being mounted to move endwise in said frame and adapted to make contact by the inner section with a key in said key way, the outer pin section coöperating with the gage surface to indicate, in relation to the gage surface, the contour of a key in the key way.

7. A key gage comprising a frame having a key way, and a number of gage pins, each consisting of a tubular section and a rod section telepscoping said tubular section, and a gage plate provided with a series of constricted orifices, said gage pins being mounted to move endwise in said frame with the ends of their tubular sections projecting into said key way and the ends of their rod sections projecting through said orifices in the gage plate.

8. A key gage comprising a frame having a key way and a gage surface, and a number of extensible and contractile gage members movably mounted in said frame adapted to make contact with a key in the key way and coöperating with the gage surface to indicate, in relation to the gage surface, the contour of a key in the key way, said frame having a sight aperture to expose to view the key and the ends of the gage members contacting therewith, to disclose the location of defects in the contour of the key.

9. A key way comprising a frame having a key way and a gage surface, a number of extensible and contractile gage members each consisting of a plurality of relatively sliding sections, frictional means to hold said sections in their various positions of extension and contraction, said gage members being each movably mounted in said frame to make contact by its inner end section with a key in the key way, the outer end section of each gage member coöperating with said gage surface to indicate, in relation to the gage surface, the contour of a key in the key way.

Signed by me at Boston, Massachusetts, this 24th day of November 1914.

JOHN C. ROSS.

Witnesses:
ROBERT CUSHMAN,
RICHARD W. HALL.

Copies of this patent may be obtained for five cents each, by addressing the "Commissioner of Patents, Washington, D. C."